United States Patent [19]

Toulhoat et al.

[11] Patent Number: 4,552,650
[45] Date of Patent: Nov. 12, 1985

[54] PROCESS FOR HYDROTREATING METAL CONTAINING OIL FRACTIONS USING A SUPPORTED CATALYST OF INCREASED RESISTANCE TO POISONS

[75] Inventors: Hervé Toulhoat, Le Pecq; Yves Jacquin, Sevre; Thierry Dupin, Garges les Gonesses, all of France

[73] Assignee: Societe Francaise des Produits pour Catalyse Pro-Catalyse, Rueil-Malmaison, France

[21] Appl. No.: 617,433

[22] Filed: Jun. 5, 1984

Related U.S. Application Data

[62] Division of Ser. No. 505,557, Jun. 17, 1983, Pat. No. 4,499,203.

[30] Foreign Application Priority Data

Jun. 17, 1982 [FR] France ............... 82 10757

[51] Int. Cl.$^4$ .............................................. C10G 45/08
[52] U.S. Cl. ........................ 208/216 PP; 208/251 H; 208/254 H
[58] Field of Search ........ 208/216 PP, 251 H, 254 H; 502/439, 355

[56] References Cited

U.S. PATENT DOCUMENTS

| 3,630,888 | 12/1971 | Alpert et al. ................ 208/216 |
| 4,395,328 | 7/1983 | Hensley, Jr. et al. ........ 208/216 PP |
| 4,395,329 | 7/1983 | Le Page et al. .............. 208/216 PP |
| 4,411,771 | 10/1983 | Bambrick et al. ............ 208/257 H |
| 4,414,196 | 11/1983 | Matsumoto et al. ............ 423/632 |
| 4,431,526 | 2/1984 | Simpson et al. ............. 208/216 PP |
| 4,460,707 | 7/1984 | Simpson .................... 208/216 PP |
| 4,462,897 | 7/1984 | Miller ...................... 208/254 H |

OTHER PUBLICATIONS

McGraw-Hill, Dictionary of Scientific and Technical Terms, p. 718.
G. D. Hobson/W. Pohl, Modern Petroleum Technology, pp. 431-433.
Kirk-Othmer, Encyclopedia of Chemical Technology, 3rd Ed., vol. 17, 1982, pp. 201-206.
Ullmanns Encyklopaedie der Technischen Chemie, 1975, pp. 690-699.

Primary Examiner—D. E. Gantz
Assistant Examiner—Anthony McFarlane
Attorney, Agent, or Firm—Millen & White

[57] ABSTRACT

A process for hydrotreating hydrocarbons uses a catalyst which comprises a carrier and at least one catalytic metal selected from vanadium, molybdenum, tungsten, nickel, cobalt and/or iron; this catalyst is in the form of a plurality of juxtaposed agglomerates of acicular platelets, oriented radially to each other. It is prepared from agglomerates of activated alumina subjected to reaction with an acid and a compound providing an anion able to combine with aluminum ions in solution.

29 Claims, 11 Drawing Figures

1cm = 33 μm

1cm = 3,3 μm

1cm=1 μm

1cm=0.5 μm

1mm = 9 nanomètres

1cm=33 μm

1cm= 3,3 μm

1cm = 1μm

1cm = 0,5μm

PROCESS FOR HYDROTREATING METAL CONTAINING OIL FRACTIONS USING A SUPPORTED CATALYST OF INCREASED RESISTANCE TO POISONS

This is a division of application Ser. No. 505,557 filed June 17, 1983, now U.S. Pat. No. 4,499,203.

BACKGROUND OF THE INVENTION

The present invention relates to a process for hydrotreating hydrocarbons, using a new type of supported catalyst characterized by a particular structure conferring thereto an exceptionally increased retention power, as compared with that of a catalyst of the prior art. The retention power of a catalyst is defined as the maximum proportion of solid deposits, expressed in grams per 100 g of fresh catalyst, that this catalyst can tolerate in its pore volume, without decrease of its activity below, for example, 20% of its initial value. The definition of the activity of a catalyst depends on the type of the contemplated chemical reaction. The above mentioned solid deposits are those occurring when certain reactants of the charge contacted with the catalyst are converted in contact with the active sites of the catalyst to solid products which precipitate on the spot and whose accumulation in the course of time results in plugging of the pores. This accumulation leads to the poisoning of the initially present catalytic sites and hinders the free circulations of the reactants and of the products through the pores.

These deposits appear, for example, when hydrotreating oil fractions containing organometallic complexes: it is known in the art that, in the presence of hydrogen, hydrogen sulfide and a hydrotreatment catalyst, most complexes are destroyed and their constitutive metal precipitates as a solid sulfide which adheres to the internal wall of the pores. This is particularly the case of the nickel, vanadium, iron and copper complexes which are naturally present in crude oils in variable proportion, depending on the origin of the oil, and which, upon distillation, tend to concentrate in the fractions of high boiling point, particularly in the residues. It is also the case of coal liquefaction products which contain metals, particularly iron and titanium. The general term hydrodemetallation is used to designate these destruction reactions of the organometallic complexes in hydrocarbons.

The solid deposits in the catalyst pores can accumulate up to complete plugging of a portion of the pores controlling the access of the reactants to a fraction of the interconnected pore system, so that this fraction deactivates even though the pores of this fraction are only weakly obstructed or even remain unmodified. This phenomenon can thus promote an early and important deactivation of the catalyst. It is particularly noticeable in the case of hydrodemetallation reactions carried out in the presence of a supported heterogeneous catalyst. Heterogeneous means not soluble in the hydrocarbon feed charge. It is found, in this case, that the peripheric pores plug faster than the central pores and also that the pore openings plug quicker than the other parts of the pores. The plugging of the pores goes with a progressive reduction of their diameter, which increases the limitation of the molecules diffusion and results in a greater pressure drop, thus in a greater heterogeneity of the deposit from the periphery to the inside of the porous particles, up to complete obstruction of the pores opening on the outside, which occurs very quickly: the access to the nearly unmodified internal porosity of the particles is then closed to the reactants and the catalyst prematurely deactivates.

The above phenomenon is well known as "pore mouth plugging". The proof of its existence and the analysis of its origins have been published several times in the international scientific literature, for example in "catalyst deactivation through pore mouth plugging" presented at the 5th international symposium on chemical reaction engineering at Houston, Tex., U.S.A., in March 1978, or again in "Effects of feed metals on catalyst ageing in hydroprocessing residuum" in Industrial Engineering Chemistry Process Design and Development, volume 20, pages 262 to 273 published in 1981 by American Chemical Society, or more recently in "Effect of catalyst pore structure on hydrotreating of heavy oil" presented at the National Congress of the American Chemical Society in Las Vegas, U.S.A., on March 30, 1982.

It has been proposed to improve the efficiency and the life time of the catalysts subjected to poisoning by pore mouth plugging by making use of bimodal catalyst carriers. A bimodal catalyst carrier is, by definition, a porous solid whose porosity is distributed in two types of pores of very different average diameters, in the form of families of interconnected macropores and micropores. The micropores have a mean diameter averaging that of a conventional monomodal catalyst carrier, for example, of 3 to 10 nanometers, and they are effective by their large specific surface multiplying the chances of contact of the reactive molecules with the catalytic sites of the surface. The macropores have an average diameter between, for example, 100 and 1000 times the average diameter of the micropores, and their object is to improve the passage of the reactive molecules throughout the pore network. The diffusion velocity through the macropores is greater for the latter molecules, and thus the presence of macropores allows a better distribution of their concentration in the pore system. The solid deposits thus distribute themselves more regularly in the pore system and a greater amount thereof can thus accumulate in the catalytic pore volume before the plugging of the pores located at the periphery of the particles results in a complete deactivation. It is thus apparent that the presence of macropores in a catalyst carrier increases the life thereof when it is subjected to poisoning by plugging of the pore mouths.

Bimodal catalysts are disclosed, for example, in the French Pat. No. 1 592 580, No. 2 234 184 and No. 2 285 177 and in the U.S. Pat. No. 4,115,248, No. 4,225,421 and No. 4,257,922.

OBJECTS OF THE INVENTION

The present invention relates to a new type of catalyst of considerably increased adsorption power, as compared with that of the known catalysts. The invention also relates to the use of these catalysts in hydrotreatment reactions of hydrocarbon fractions, particularly hydrogenation, hydrodemetallation, hydrodesulfuration, hydrodenitrogenation and hydrodeoxygenation.

DESCRIPTION OF THE INVENTION

The porous catalyst used in the process of the invention comprises a carrier and at least one catalytic metal or compound of a catalytic metal, said metal being vanadium, molybdenum, tungsten, nickel, cobalt and/or iron; it is characterized by the juxtaposition of a plurality of elemental units, called agglomerates, each agglomerate being itself formed of a plurality of acicular platelets, generally oriented with respect to one another as the radii of a sphere whose center is common with that of the agglomerate. As a rule, a large proportion, usually at least 50% of the acicular platelets, have a size along their longer axis between 0.05 and 5 micrometers and preferably between 0.1 and 2 micrometers, a ratio of this size to their average width between 2 and 20, and preferably between 5 and 15, and a ratio of this size to their average thickness between 1 and 5 000, and preferably between 10 and 200. A large proportion, usually at least 50% of the agglomerates of acicular platelets constitutes a collection of pseudo-spherical particles of an average size between 1 and 20 micrometers, preferably between 2 and 10 micrometers. This structure is very similar to that of a pile of thorny chestnut-husks or of a pile of sea-urchins.

Without limiting the invention to a particular explanation of the working mechanism of the catalyst, it is admitted that the above structure comprises macropores and mesopores (the mesopores are pores of a size between the size of the micropores and that of the macropores: the mesopores thus range roughly between 10 and 100 nanometers) and practically no micropores. The space left free between the joint agglomerates whose walls have a very high specific surface, since they wear well individualized acicular platelets, would represent the network of the interconnected macropores. The wedged interstices between the acicular platelets would constitute the proper active pores (in that case, essentially mesopores).

Figure 1:
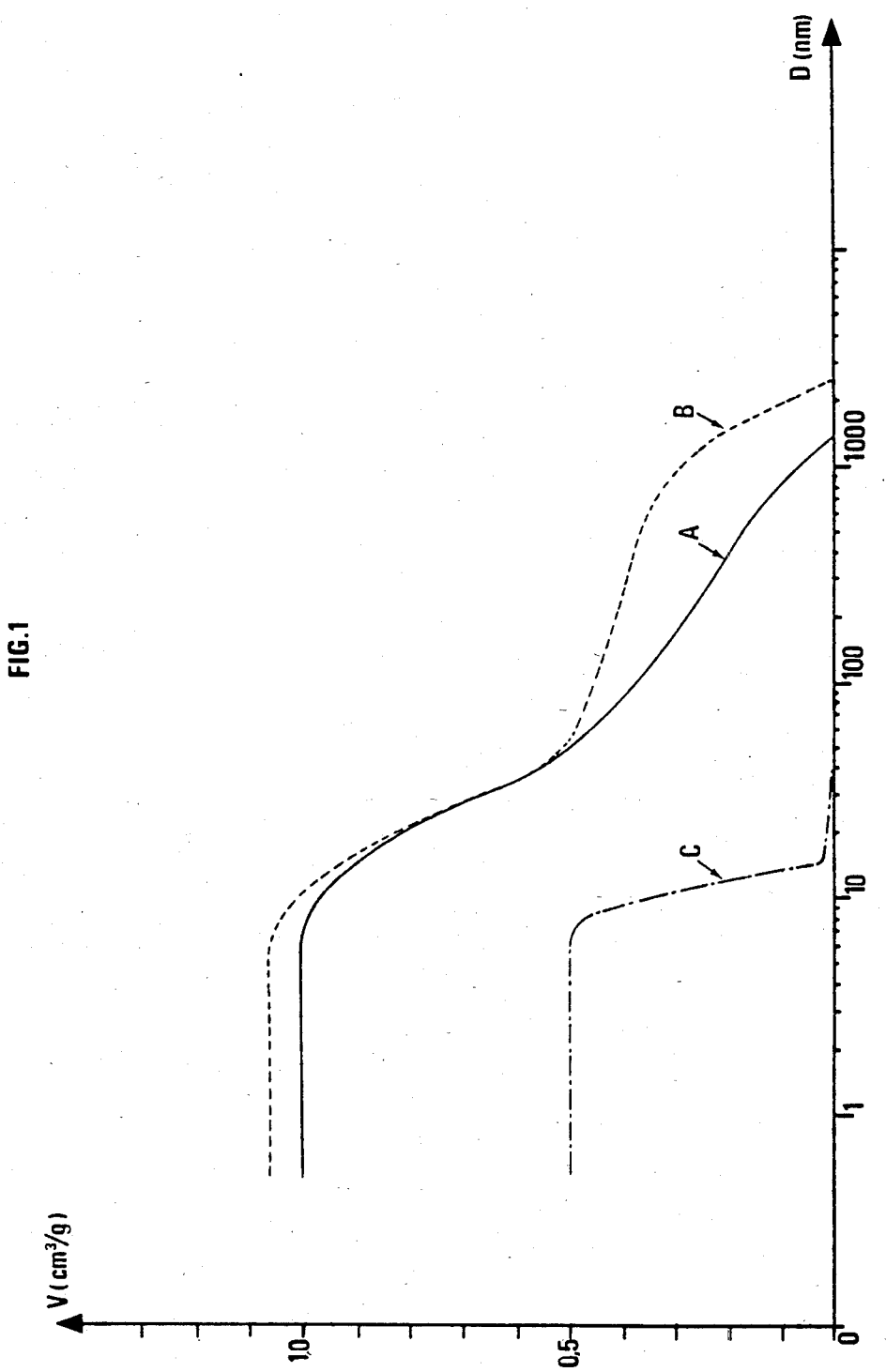
FIG. 1 shows the pore distributions of a catalyst according to the invention (A) and prior art biomodal (B) and monomodal (C) catalysts.
Figure 2:
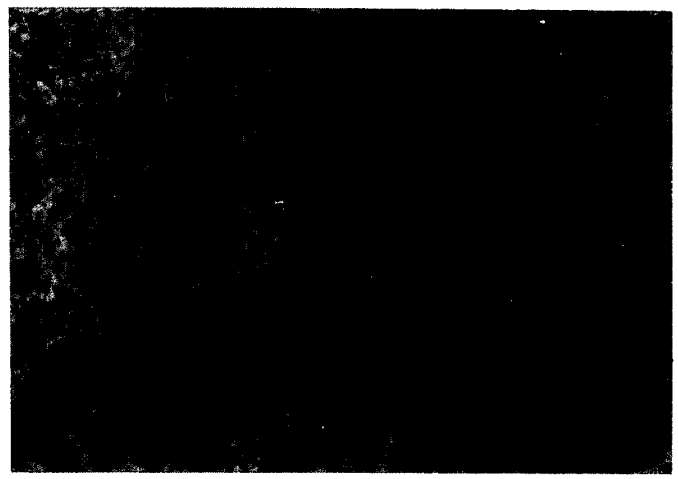
FIGS. 2–5 are electron micrographs, at successively higher enlargements, of catalyst A.
Figure 3:
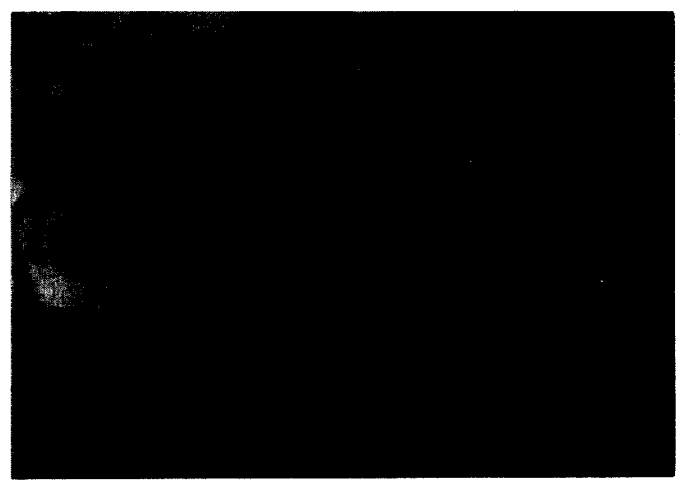
Figure 4:

For a structure of this type, the curve representing the aggregate distribution of the pore volume versus the pore diameter, as obtained by the conventional technique of mercury penetration under pressure, is neither monomodal nor bimodal since no more distinct pore families appear, whose pore diameters would have well defined average values; only a relatively continuous pore distribution appears between two extreme diameter values. Between these utmost values, no horizontal level appears on the curve of the cumulated pore distribution. FIG. 1 allows a comparison of the pore distribution curve of a catalyst according to the invention (A) with those of the monomodal (C) or bimodal (B) catalysts of the prior art.

The catalyst of the invention has a preferred pore distribution as follows:

total pore volume: 0.7 to 2.0 cm$^3$/g, preferably 0.9 to 1.3 cm$^3$/g.

% of the total pore volume as pores of an average diameter lower than 10 nanometers: 0–10

% of the total pore volume as pores of an average diameter between 10 and 100 nanometers: 40–90

% of the total pore volume as pores of an average diameter between 100 and 500 nanometers: 5–60

% of the total pore volume as pores of an average diameter between 500 and 1000 nanometers: 5–50

% of the total pore volume as pores of an average diameter higher than 1000 nanometers: 5–20

The specific surface of the catalyst according to the invention is between 50 and 250 m$^2$/g and, in a particularly preferred embodiment, between 120 and 180 m$^2$/g.

The scanning electronic microscopy allows an unequivocal characterization with microphotographs of a catalyst having the structure of the invention. FIGS. 2 to 5 are four microphotographs at the respective 300×, 3 000×, 10 000× and 20 000× enlargements of a catalyst according to the invention (catalyst A) which illustrate the above particular structure of juxtaposed sea-urchins.

Figure 6:
FIG. 6 is an electron micrograph of a bundle of acicular platelets of catalyst A.
Figure 7:
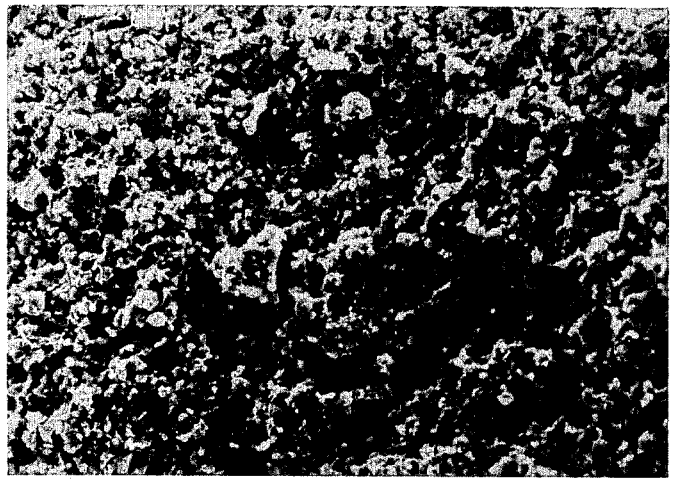
FIGS. 7–10 are electron micrographs of prior art catalyst B.
Figure 8:
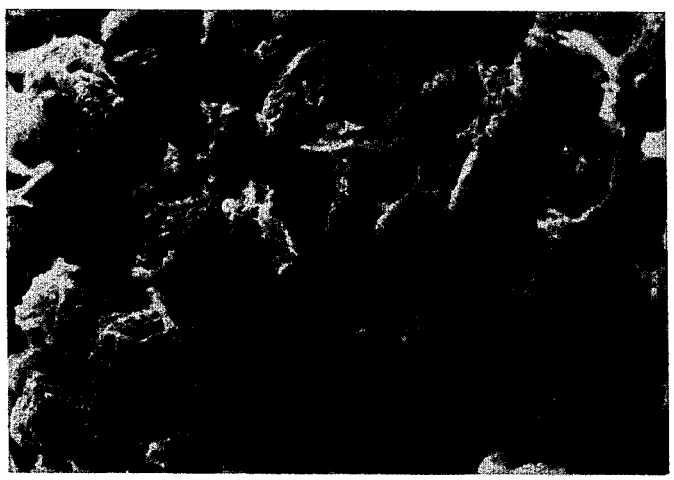
Figure 9:
Figure 10:

FIG. 6 is a microphotograph at the nominal enlargement 110,000× of a bundle of acicular platelets of catalyst A, which illustrates the typical aspect of these platelets. The intervals between the opposite arrows (1) show the trace of platelets set on the edge and give an approximate value of the thickness of these platelets. The interval between the opposite arrows (2) shows a small platelet parallel to the plane of the photograph and is a value of the average width of this platelet. In FIG. 6, the scale is 9 nanometers per millimeter and the dark portions show the catalytic material.

Conversely, the FIGS. 7 to 10 show four microphotographs of a catalyst sample (catalyst B) prepared from bimodal alumina balls obtained by the process patented in France under the No. 2 449 474; these photographs were taken at the same respective enlargements as in the FIGS. 2 to 5 and with the same camera: These photographs illustrate correctly the description given in the latter patent, according to which the macroporosity results from the interparticle free spaces existing between spheroidal microporous particles, whose particle size distribution and packing capacity determine the macroporous volume and the size of the macropores. On the photographs of FIGS. 2 to 5 and 7 to 10, the dark portions correspond to the free spaces of the catalyst structure, i.e. to the macroporosity, while the light portions correspond to the catalytic material. The distribution of the macropores diameters of catalyst B may be deduced from the photographs and is in good agreement with that obtained by mercury porosimetry as shown in FIG. 1. The comparison of the microphotographs shows that the spheroidal microporous particles of catalyst B do not have the sea-urchin structure of the catalyst prepared according to the invention.

U.S. Pat. No. 3,630,888 discloses a catalyst for hydrocracking and desulfurizing hydrocarbon residues; this catalyst comprises micropores, where is formed the active catalytic surface, and access channels to these micropores where no substantial active surface is formed. These access channels can be classified in two distinct groups, a first group of pore diameters larger than 100 nanometers comprising 10–40% of the total pore volume and a second group of pore diameters between 10 and 100 nanometers comprising 10–40% of the total pore volume. A portion of these access channels is characterized by an arrangement radiating from the center of the microporous agglomerates, whose assembly constitutes the catalytic structure, to the periphery. However it is expressly pointed out that these channels must be linear and of substantially uniform diameter; these channels are obtained by removing a porogenous substances which is either explosive or constituted of acicular crystals whose radial growth can be improved while forming an agglomerate. The present invention is conceived in a quite different manner and, as shown in the following examples, the following differences, which characterize more particularly the catalyst of the invention, increase noticeably its resistance to the plugging of pore mouths:

The pores present in the catalyst of the invention, chiefly constituted of the free spaces between the radiating acicular platelets, are "wedge-shaped" pores and thus of continuously varying diameter.

These radiating pores do not necessarily have a linear direction.

These radiating pores do not constitute access channels for the micropores of diameters lower than 10 nanometers but constitute themselves a mesoporosity having an active catalytic surface.

These differences are better summarized by the fact that the catalyst of the referenced U.S. Pat. No. 3,630,888 includes in its total pore volume at least 20% of micropores of a diameter lower than 10 nanometers, whereas the catalyst of the present invention contains at most 10% thereof. The acicular structure of the catalyst of the invention is linked to the hereinbefore described material in the form of platelets, whereas the acicular structure of the catalyst disclosed in the U.S. Pat. No. 3,630,888 is that of the access channels within the agglomerates.

The applicant has surprisingly discovered that a catalyst having the structure of the invention has a better resistance than the catalysts known up to now to the poisoning phenomenon of pore mouth plugging. For example, in the case of the hydrotreatment of a deasphalted oil obtained by deasphalting of the Venezuelian heavy crude oil called BOSCAN, the retention power of a catalyst according to the invention appeared as 2.5 times higher than that of a microporous monomodal catalyst and nearly 50% higher than that of a macroporous and microporous bimodal catalyst. The reasons thereof are probably that the wedge-shape of each mesopore compensates for or nullifies the concentration gradients of the reactants which would normally exist in a cylindrical pore, which phenomenon adds to a very favorable geometry for preventing pore mouth plugging. Furthermore, each mesopore or nearly each mesopore has an independent access to the intersticial macroporosity; to summarize, the catalytic structure of the invention favors at best an homogeneous accumulation of the deposits, without prematurate deactivating plugging.

A catalyst according to the invention can be prepared according to the following method, without limiting the invention to this particular method of manufacture: the carrier consists of agglomerates of particles in the order of 0.1 to 10 mm or of powder in particles of about 20 to 100 micrometers having themselves the hereinbefore mentioned sea-urchin structure and complying approximately with the same characteristics as those of the catalyst according to the invention, particularly as concerns the shape and size of the platelets and agglomerates, the specific surface and the porosity.

The catalytic metal(s) is (are) deposited on these agglomerates by any known method, i.e. at least one of the following metals: molybdenum, tungsten, iron, vanadium, cobalt and nickel. Preferred associations are molybdenum+cobalt, molybdenum+nickel, vanadium+nickel, tungsten+nickel.

The above metals are usually introduced as precursors, such as oxides, acids, salts, organic complexes, and in such amounts that the catalyst comprises 0.5 to 40% b.w. of these metals, expressed as oxides. It is terminated with an optional drying and a thermal treatment at a temperature between 400° and 800° C.

When the catalyst of the invention is destined to be used in hydrocarbon demetallation reactions, the following method is particularly advantageous for introducing the catalytic metals, x designating the amount of metals of the feed charge as organometallic compounds, expressed as parts per million by weight. The above agglomerates are arranged in a vertical reactor. This reactor can be the apparatus subsequently used for the hydrodemetallation reaction. The reactor is filled up with the hydrocarbon charge to be treated, brought to a temperature between about 50° C. and about 200° C., then this charge is circulated, preferably upwardly, at a feed rate (VVH) between about 0.1 and about 2, preferably between 0.5 and 1 volumes per volume of alumina and per hour. The hydrocarbons withdrawn from the reactor can be, or not, recycled to the input of the reactor. They are preferably recycled. At the same time, a gas containing at least 70% by volume of hydrogen and at least 0.5% by volume of hydrogen sulfide is co-currently circulated in the apparatus, so that the ratio of the gas feed rate to the liquid feed rate is between about 500 and about 2000 $Nm^3/m^3$, preferably from 1000 to 1500 $Nm^3/m^3$, while maintaining in the reactor a pressure between about 80 and about 250 bars, preferably between 100 and 200 bars. When the streams of fluids have been stabilized, the temperature of the reactor is increased up to a value between 360° and 420° C., and preferably between 380° and 410° C., the rate of temperature increase being lower than 20° C. per hour. When the average temperature in the reactor has reached the selected value between 360° and 420° C., the circulation of the fluids is maintained for a period of at least 50,000/x/VVH hours. The proportion x of metals present as organometallic compounds in the hydrocarbon charge used in this particular method for depositing catalytic metals on the catalyst of the invention can be artificially increased by introduction into the charge of any complex soluble therein as, for example, an alcoholic solution of molybdenum blue, molybdenum octoate, molybdenum naphthenate, a molybdenum resinate, a vanadium resinate, nickel, vanadium or molybdenum acetylacetonates, this list being not exhaustive. The catalyst manufacturing time can be, in that case, substantially decreased since, according to the above formula, it is inversely proportional to the value of x.

The carrier, the use of which is an essential element of the invention, can be alumina, silica, silica-alumina or a natural or synthetic silico-aluminate, for example, clay, or carbon. Alumina is preferred, particularly alumina comprising 100 to 1000 parts per million by weight of silica. In the latter case, it is preferably obtained by the following method:

(a) treating agglomerates of active alumina in an aqueous medium consisting of a mixture of at least one acid able to dissolve at least a portion of the alumina of the agglomerates and at least one compound supplying an anion able to combine with the aluminum ions in solution, the latter compound being a chemical distinct from the above acid, (b) simultaneously or subsequently subjecting the so-treated agglomerates to a treatment at a temperature between about 80° C. and about 250° C. for a period of from about a few minutes up to about 36 hours, (c) optionally drying the agglomerates and subjecting them to a thermal activation at a temperature between about 500° C. and about 1100° C.

The agglomerates of activated alumina utilized in the present invention are prepared from an activated alumina powder of poorly crystallized and/or amorphous structure obtained, for example, according to the process of the French Patent No. 1 438 497. This process consists of wetting with an aqueous solution the activated alumina of poorly crystallized and/or amorphous structure, agglomerating it, ageing the resultant agglomerates in humid atmosphere at a moderate temperature, preferably between about 60° and about 100° C., drying and then calcining these agglomerates at a temperature between about 250° C. and about 900° C.

In the present process, by alumina of poorly crystallized structure is meant an alumina whose X-ray analysis shows a diagram having only one or more diffuse rays corresponding to the crystalline phases of the low temperature transition aluminas and comprising essentially the phases chi, rho, eta, gamma, pseudogamma and their mixtures.

By alumina of amorphous structure is meant an alumina whose X-ray analysis does not reveal any characteristic ray of any crystalline phase.

The activated alumina to be used is generally obtained by quick dehydration of aluminum hydroxides such as bayerite, hydrargillite or gibbsite, nordstrandite or aluminum oxyhydroxides such as boehmite and diaspore. This dehydration can be performed with a hot gas stream in any appropriate apparatus. The gas input temperature is generally from about 400° C. to 1200° C. and the contact time of the hydroxide or oxyhydroxide with the hot gas is generally from a fraction of a second to 4–5 seconds.

The specific surface, measured by the BET method, of the activated alumina obtained by quick dehydration of hydroxides or oxyhydroxides is generally from about 50 to 400 m$^2$/g, the particle diameter is generally from 0.1 to 300 micrometers and preferably from 1 to 120 micrometers. The fire loss, measured by calcination at 1000° C., is generally from 3 to 15%, which corresponds to a molar ratio H$_2$O/Al$_2$O$_3$ between about 0.17 and 0.85.

According to a particular embodiment, a preferred alumina is that obtained by quick dehydration of the Bayer hydrate (hydrargillite) which is an easily available and very cheap industrial aluminum hydroxide; this activated alumina is well known in the art; its manufacture has been disclosed, for example, in the French Pat. No. 1 108 011.

The activated alumina can be used as such or after treatment, so as to decrease its sodium hydroxide content, expressed as Na$_2$O, to below 1000 ppm. The activated alumina can be crushed, or not.

The agglomeration of the activated alumina is effected according to methods well known in the art, particularly by pelletizing, extrusion, shaping as balls in a bowl-granulator, etc . . .

This agglomeration is preferably effected, as known in the art, by adding porogenous agents to the mixture to be agglomerated. The porogenous agents to be used are specially wood powder, charcoal, cellulose, starch, naphthalene and, as a rule, any organic compound removable by calcination.

The ageing, drying and/or calcining of the agglomerates is effected thereafter.

The activated alumina agglomerates to be used in the process of the invention have usually the following properties: their fire loss, measured by calcination at 1000° C., is between about 1 and about 15%, their specific surface is between about 100 and about 350 m$^2$/g, their total pore volume is between about 0.45 and about 1.5 cm$^3$/g.

The agglomerates of activated alumina are treated, according to the invention, in an aqueous medium consisting of a mixture of at least one acid able to dissolve at least a portion of alumina of the agglomerates with at least one compound providing an anion able to combine with the aluminum ions in solution.

According to the invention, the acid able to dissolve at least one portion of the alumina of the agglomerates is any acid which, when contacted with the agglomerates of activated alumina, as hereinbefore defined, dissolves at least one portion of the aluminum ions. The acid must dissolve at least 0.5% and at most 15% b.w. of the alumina of the agglomerates. Its concentration in the aqueous medium of treatment must be lower than 20% b.w. and preferably between 1 and 15%.

The preferred acids are strong acids such as nitric acid, hydrochloric acid, perchloric acid, sulfuric acid or weak acids employed at such a concentration that the pH of their aqueous solution is below about 4.

According to the invention, a compound supplying an anion able to combine with the aluminum ions in solution is any compound able to liberate in solution an anion A(−n) able to form with the cations Al(3+) products whose atomic ratio n(A/Al) is at most 3. A particular case of these compounds can be illustrated by the basic salts of the general formula Al$_2$(OH)xAy wherein 0 < x < 6; ny < 6; n is the number of charges of the anion A.

The concentration of this compound in the aqueous medium of treatment must be lower than 50% b.w. and preferably between 3 and 30%.

The preferred compounds are those able to liberate in solution anions selected from the group consisting of the nitrate, chloride, sulfate, perchlorate, chloroacetate, dichloroacetate, trichloroacetate, bromoacetate and dibromoacetate anions, and the anions of the general formula:

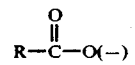

wherein R is a radical selected from the group comprising H, CH$_3$, C$_2$H$_5$, CH$_3$CH$_2$CH$_2$ and (CH$_3$)$_2$CH.

The compounds able to liberate in solution the anion A(−n) can liberate this anion either directly, for example by dissociation, or indirectly, for example by hydrolysis. These compounds can be selected from the group comprising: the inorganic or organic acids, the anhydrides, the organic or inorganic salts and the esters. Examples of inorganic salts are the alkali or alkaline-earth metal salts soluble in aqueous medium, such as the sodium, potassium, magnesium, calcium, ammonium, aluminum or rare earth metal salts.

This first treatment can be effected either by dry impregnation of the agglomerates or by immersion of the agglomerates in the aqueous solution consisting of the mixture according to the invention. Dry impregnation means contacting alumina agglomerates with a volume of solution not exceeding the total pore volume of the agglomerates.

According to a particularly preferred embodiment, the aqueous medium will be a mixture of nitric and acetic acids or of nitric and formic acids.

The so-treated agglomerates are simultaneously or subsequently subjected to a treatment at a temperature between about 80° and about 250° C. for about 5 mn to about 36 h.

This hydrothermal treatment does not result in an alumina loss.

The temperature is preferably from 120° to 220° C. and the treatment time from 15 mn to 18 h.

This treatment is a hydrothermal treatment of the agglomerates of activated alumina; it results in the conversion of at least one part thereof to boehmite. This hydrothermal treatment can be effected under a pressure of saturating vapor, i.e. under a partial steam pressure amounting to at least 70% of the saturating vapor pressure corresponding to the treatment temperature.

Without limiting the invention to its theoretical aspects, it is thought that the association of an acid allowing the dissolution of at least one part of the alumina with an anion allowing the formation of the above products in the hydrothermal treatment results in the formation of a particular boehmite, which is a precursor of the small acicular plates of the invention, whose growth proceeds radially from crystallization germs.

Moreover, the concentrations of the acid and the compound in the treatment mixture and the conditions of the hydrothermal treatment are such that no alumina loss occurs.

The so-treated agglomerates are optionally dried at a temperature usefully selected between about 100° and 200° C. for a sufficient time to remove any water not chemically bound. The agglomerates are then subjected to a thermal activation at a temperature from about 500° C. to about 1100° C. for about 15 mn to 24 h.

The activation may be performed in several steps, and the activation temperature is preferably 550° C. to 950° C.

The resultant activated alumina agglomerates have the following characteristics:
  A compressed filling density of about 0.36 to 0.75 g/cm$^3$.
  A total pore volume (VPT) of about 0.7 to 2.0 cm$^3$/g.
  A distribution of the pore volume, in relation with the pore size, conforming with the above values concerning the catalyst of the invention, taking the weight increase due to the deposition of metals into account.
  A specific surface, determined by the BET method, of about 80 to about 250 m$^2$/g.
  A mechanical strength of about 2 to 20 kg, determined by the grain to grain crushing method.

The above process for manufacturing alumina agglomerates surprisingly modifies the distribution of the pore volumes in relation with the pore size of the untreated agglomerates. It allows an increase of the proportion of pores between 10 and 100 nanometers, a reduction of the proportion of pores lower than 10 nanometers and a reduction of the proportion of pores higher than 500 nanometers with a slight modification of the proportion of pores between 100 and 500 nanometers.

The alumina agglomerates thus obtained can have been thermally stabilized by rare earth metals, silica or alkaline-earth metals as well-known in the art. For instance, they can be stabilized by the process of U.S. Pat. No. 4,061,594.

The catalysts of the invention can be used, for example, in all hydrotreatments such as hydrocarbons hydrodesulfuration, hydrodemetallation, hydrodenitrogenation, oil hydrofinishing, hydrocracking, hydrogenation, dehydrogenation, and dehydrocyclization.

These hydrotreatments can be applied, for example, to oil fractions, such as crude oils having an API degree lower than 20, extracts from bituminous sands and shales, atmospheric residues, vacuum residues, asphalts, deasphalted oils, deasphalted vacuum residues, deasphalted crudes, heavy fuels, atmospheric distillates and vacuum distillates, or otherwise to other hydrocarbons, such as coal liquefaction products. The hydrotreatments destined to remove such impurities as sulfur, nitrogen and metals, and to lower the average boiling point of these hydrocarbons are conventionally used at a temperature of about 370° to 470° C., under a hydrogen partial pressure of about 50 to 300 bars, at a space velocity of about 0.3 to about 5 volumes per volume of catalyst per hour, the ratio of the hydrogen gas to the liquid hydrocarbon charge being from 200 to 5000 Nm$^3$ per m$^3$.

The following examples illustrate the invention without limiting the scope thereof.

EXAMPLE 1

4 kg of alumina balls obtained by the process of the French Patent No. 1 438 497 are treated in a 10 liter reactor. These balls have the following properties:
  Specific surface: 192 m$^2$/g
  Total pore volume: 0.84 cm$^3$/g
  Volume of the pores having an average diameter lower than 10 nanometers: 0.06 cm$^3$/g
  Volume of the pores having an average diameter between 10 and 100 nanometers: 0.40 cm$^3$/g
  Volume of the pores having an average diameter between 100 and 500 nanometers: 0.10 cm$^3$/g
  Volume of the pores having an average diameter between 500 and 1000 nanometers: 0.10 cm$^3$/g
  Volume of the pores having an average diameter higher than 1000 nanometers: 0.18 cm$^3$/g The treatment is performed in vapor phase at a temperature of 195° C. for 3 hours. The treatment medium consists of a mixture of nitric acid in a proportion of 7 g per 100 g of $Al_2O_3$ and acetic acid in a proportion of 10 g per 100 g $Al_2O_3$. Nitric acid is able to dissolve about 2.5% b.w. of alumina balls. Acetic acid supplies the acetate anion which combines with the aluminum ions in solution to form compounds having an atomic ratio $CH_3COOH/Al$ lower than 3. The so-treated balls are thermally activated at 900° C. for 2 h in an oven. They have the following properties:
  Filling density when packed: 0.46 g/cm$^3$
  Particle size: 2 to 4 mm
  Total pore volume: 1.10 cm$^3$/g
  Specific surface: 115 m$^2$/g
  Volume of pores having an average diameter lower than 10 nanometers: 0.03 cm$^3$/g
  Volume of pores having an average diameter between 10 and 100 nanometers: 0.72 cm$^3$/g
  Volume of pores having an average diameter between 100 and 500 nanometers: 0.15 cm$^3$/g Volume of pores having an average diameter between 500 and 1000 nanometers: 0.12 cm$^3$/g Volume of pores having an average diameter higher than 1000 nanometers: 0.08 cm$^3$/g It is apparent that the treatment has nearly completely removed the pores of an average diameter lower than 10 nanometers, has increased the proportion of pores of an average diameter between 10 and 100 nanometers and has decreased the proportion of pores of an average diameter higher than 1000 nanometers.

375.3 g of ammonium heptamolybdate tetrahydrate are weighed exactly and then dissolved into 1500 cm$^3$ of distilled water in a stirred reactor heated to 60° C. Separately, 254.6 g of nickel nitrate hexahydrate are weighed exactly and then dissolved at room temperature into 1500 cm$^3$ of distilled water in a stirred reactor. The two resultant solutions are then mixed and the total volume of the mixture is raised to 4200 cm$^3$ exactly by distilled water addition. The temperature of this mixture, which constitutes the impregnation solution, is adjusted to 25° C.; then, without delay, this mixture is contacted with 4 kg of the alumina balls prepared as above; there is used the well known dry impregnation technique. The impregnated balls are then maintained for 12 h in a closed, water-saturated, atmosphere and then dried in an air stream at 110° C. The dried balls are then calcined in a rotative oven directly heated by a combustion flame, first for 2 h at 350° C., then for 2 h at 500° C., the latter calcination being the final operation in the catalyst manufacture.

The resultant catalyst will be named catalyst A in the following text.

The chemical analysis of catalyst A has given the following composition, expressed as % b.w.:

Al$_2$O$_3$: 91.5%
MoO$_3$: 7.0%
NiO: 1.5%

Figure 5:

The FIGS. 2 to 5 present microphotographs of catalyst A taken with a scanning electronic microscope of the JEOL trade mark, type JSM 35 CF, at the respective enlargements of 300, 3000, 10 000 and 20 000. The scales indicated on each photograph may be used to measure the size of the observable details. The dark portions correspond to the porosity, whereas the light portions correspond to the catalyst material. It is apparent that the structure of catalyst A is effectively of the sea-urchin type of the invention, consisting of a juxtaposition of agglomerates, the majority of which have an average size of 3.5 micrometers, each agglomerate being formed of small lengthened platelets, assembled generally radially with respect to the center of the agglomerates. The size of the acicular platelets can be deduced particularly from FIG. 6 showing a microphotograph at the nominal enlargement of 110,000, taken with a scanning transmission electronic microscope (S.T.E.M. VG HB5). The dark regions correspond here to the catalytic material. The scale of this microphotograph is 9 nanometers per millimeter. The intervals delimited by the arrows No. 1 and 2 correspond respectively to the traces of the acicular platelets arranged in a direction perpendicular or parallel to the plane of the view. The intervals 1 give thus an approximate measuring of the thickness of the plaquettes and the interval 2 a measuring of the width of the platelet, thus respectively about 2 to 4 nanometers and 60 nanometers. Along their axis of greater development, the plaquettes of FIG. 6 have a length of about 0.5 to 1 micrometer, which is agreement with the lengths measured in FIG. 5 showing these plaquettes arranged in the agglomerates. The ratio of the average length to the average width is thus about 8 to 16 and the ratio of the average length to the average thickness is about 120 to 480.

FIG. 1 illustrates the cumulated pore distribution of catalyst A. The diameter of the pores (D), expressed in nanometers, is given in abscissae and the cumulated pore volume (V), expressed in cm$^3$/g, in ordinates. It can be verified that the distribution conforms with the definition of the invention and particularly, that it does not comprise a clearly identified intermediate inflexion point.

1000 cm$^3$ of catalyst A have been used in fixed bed in the reactor of a hydrotreatment pilot unit, in the operating conditions of Table 1, to treat an up flow of a deasphalted oil charge extracted from a Boscan Venezuelian crude oil and whose characteristics are given in Table 2.

Under these conditions, the experiment has been continued for 2350 h and has been stopped for reasons independent from the catalyst. The residual demetallation activity before stopping was higher than 50% of the initial activity. The pressure drop through the reactor was lower than 10 bars during the whole test. After washing with a straight run gas oil charge under the conditions of the test, then drying with a hot hydrogen stream, the catalyst was discharged from the reactor by gravity; no plugging deposit or agglomeration of catalyst particles was observed during the discharge; the used catalyst balls remained well separated and could be handled as easily as the fresh catalyst.

The chemical analysis of the used catalyst showed that 130 g of nickel and vanadium, as total, had been retained per each 100 g of the fresh catalyst. The retention power, such as defined above, of catalyst A, used in these conditions, was thus higher than the above value.

The average performances registered for the whole experiment were as follows:

Hydrodesulfuration (HDS): 50%
Hydrodemetallation (HDM): 85%

EXAMPLES 2 TO 5

Example 1 was repeated, except that, in the manufacture of the catalyst, the 7 g of nitric acid and the 10 g of acetic acid, per each 100 g of alumina, were replaced respectively with:

(a) 7 g of nitric acid and 6 g of formic acid,
(b) 15 g of acetic acid and 12 g of ammonium sulfate,
(c) 4 g of hydrochloric acid and 5 g of acetic anhydride,
(d) 7 g of nitric acid and 6 g of ethyl acetate.

The resultant catalysts had substantially the same structure conforming to the invention and the same pore distribution curve, and their performances in the same hydrotreatment test were substantially the same of those of the catalyst of example 1.

TABLE 1

| Operating conditions of the hydrotreatment test of example 1. | |
|---|---|
| Total pressure | 100 bars |
| Space velocity | 1 1/l/h |
| Temperature | 380 to 410° C. |
| H$_2$/charge ratio | 1000 Nm$^3$/m$^3$ |

The catalyst was presulfurized with a gas mixture of hydrogen + 3% by volume hydrogen sulfide at 350° C. for 6 hours under 1 atm.

TABLE 2

Characteristics of the deasphalted oil charge (DAO) extracted from a topped Boscan crude, as used in the hydrotreatment test of example 1.

| | |
|---|---|
| Specific gravity at 20° C. | 0.989 g/cm$^3$ |
| Viscosity at 100° C. | 161 mm$^2$/s |
| Viscosity at 150° C. | 25.3 mm$^2$/s |
| Conradson carbon | 10.35% b.w. |
| Insoluble in n-heptane | 0.17% b.w. |
| Insoluble in n-pentane | 1.7% b.w. |
| Total sulfur | 5.16% b.w. |
| Total nitrogen | 3990 ppm |
| nickel | 47 ppm |
| vanadium | 400 ppm |
| ASTM distillation D 1160 | |
| Initial point | 240° C. |
| 50% point | 550° C. |

EXAMPLE 6

4 kg of double porosity alumina balls are prepared according to the process described in example 1 of the French Patent No. 2 449 474, by admixing the boehmite sol with 76% of spheroidal particles at pH 7. These balls are then dry impregnated according to the technique of example 1, to yield a catalyst having the same composition by weight as catalyst A. This catalyst will be referred to hereinafter as catalyst B.

The characteristics of catalyst B are the following:
Specific surface: 110 m$^2$/g
Particle size: 2 to 4 mm
Total pore volume: 1.08 cm$^3$/g
Density when packed: 0.45 g/cm$^3$
Volume of the pore having an average diameter lower than 10 nanometers: 0.03 cm$^3$/g
Volume of the pores having an average diameter between 10 and 100 nanometers: 0.60 cm$^3$/g
Volume of the pores having an average diameter between 100 and 500 nanometers: 0.08 cm$^3$/g
Volume of the pores having an average diameter between 500 and 1000 nanometers: 0.07 cm$^3$/g
Volume of the pores having an average diameter greater than 1000 nanometers: 0.30 cm$^3$/g.

The curve showing in FIG. 1 the cumulated pore distribution of the catalyst B may be compared to that of the catalyst A. The two curves are quite similar and can be superposed in the range of the pore diameters of 15 nanometers to 50 nanometers. They differ by the volume of pores having a diameter greater than 100 nanometers.

The FIGS. 7 to 10 show microphotographs of catalyst B taken under the same conditions as used for catalyst A of example 1. These microphotographs show that the catalyst B has a structure differing greatly from that of the catalyst complying with the invention; more particularly, it consists of a juxtaposition of agglomerates which are nearly all spherical and whose diameters average 10 micrometers; however these agglomerates do not consist of an assembly of acicular platelets, as according to the invention.

The catalyst of reference HR 306 sold by the French Company PROCATALYSE is a conventional microporous monomodal hydrotreatment catalyst. A sample thereof is hereinafter referred to as catalyst C. The pore distribution curve of this catalyst is shown in FIG. 1, besides the curves corresponding to the catalysts A and B. The composition by weight of this catalyst is the following:
CoO: 3%
MoO$_3$: 14%
Al$_2$O$_3$: 83%

The textural characteristics of catalyst C are the following:
Particle size: 1.2 mm extrudates
Specific surface: 200 m$^2$/g
Total pore volume: 0.50 cm$^3$/g.
Pore volume as pores having an average diameter greater than 30 nanometers: nil.

The catalysts A, B and C were compared in hydrotreatment tests conducted under identical conditions. The hydrocarbon charge was the charge of example 1, whose characteristics have been summarized in Table 2. The operating conditions were so selected as to artificially strongly accelerate the poisoning by plugging of the pore mouths. These operating conditions are summarized in Table 3. The tests have been effected in upflow in a laboratory reactor, each with 40 cm$^3$ of catalyst in fixed bed.

Figure 11:
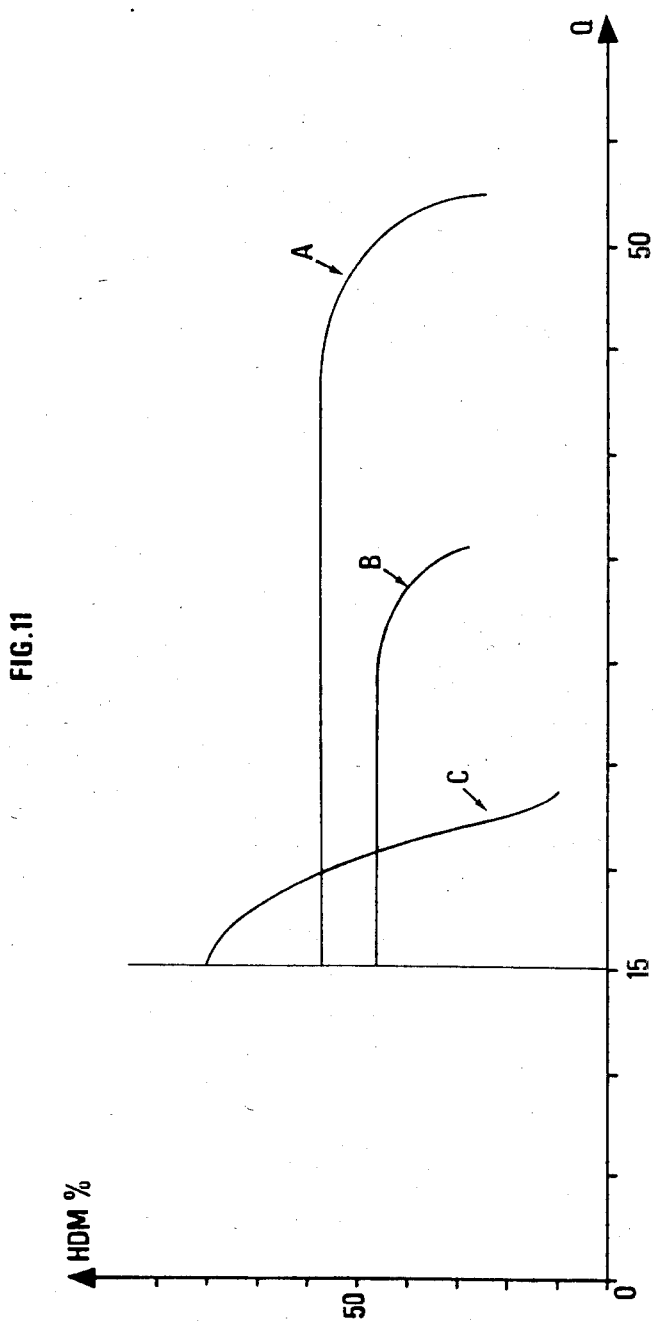
FIG. 11 graphically represents the results of comparative tests of catalysts A, B and C in a hydrotreatment process.

FIG. 11 shows the results obtained in these comparison tests. There have been shown, in this Figure, in ordinates, the hydrodemetallation rate (HDM in %) and, in abscissae, the cumulated metal amount (Q) retained by the catalyst in the course of time, expressed in grams per 100 g of fresh catalyst. The hydrodemetallation rate is: HDM=100(Mo—M)/MO, where MO is the metal content of the initial charge and M the metal content of the liquid effluent at the output of the reactor.

The hydrodemetallation activity of a catalyst under given operating conditions is defined here as the HDM value. The cumulated metal content of the catalyst can be deduced from a material balance of the metals, according to the HDM values measured at regular intervals and to the imposed value of the hourly volumic space velocity of the liquid charge. In FIG. 11, the points corresponding to the first 192 hours of run at variable temperatures, between 360° and 420° C. and at VVH=1 have not been represented. During this first step of severe ageing, the HDM values were always higher than or equal to 80% and at least one time equal to 100% with each catalyst. At the end of this period, the cumulated metal amount was about 15 g per 100 g of each of the three catalysts.

It can be observed from FIG. 11 that, under these conditions of accelerated ageing, the catalyst A of the invention has a retention capacity of about 50%, whereas that of Catalyst B is 32% and that of catalyst C only 20%. These retention capacities have been confirmed by the chemical analysis of the catalysts discharged from the reactors.

Catalyst C, which has no macroporosity, has a strong initial activity resulting from its high content of active metals; however it poisons very quickly by pore mouth plugging. Catalyst B, of high porosity and with macropores, resists better than catalyst C. Catalyst A, according to the invention, which has substantially the same pore volume, the same specific surface and the same volumic distribution of the pores of average diameter lower than 50 nanometers as catalyst B but which differs therefrom by its sea-urchin organization conforming to the invention, resists far better to the poisoning by metal deposition. This clearly shows the surprising effect attributable to the structure of the invention. This comparison example also shows that neither the specific surface, nor the total pore volume, nor the curve of pore distribution in the domain of the pores having an average diameter lower than 50 nanometers can be used to foresee the retention capacity of a hydrocarbon demetallation catalyst. The definition of these properties is not characteristic of this catalyst.

TABLE 3

Succession of the operating conditions of the tests described in example 6.

| TEMPERATURE (°C.) | SPACE VELOCITY (l/l/h) | PERIOD (h) |
|---|---|---|
| 360 | 1 | 48 |
| 380 | 1 | 48 |
| 400 | 1 | 48 |
| 420 | 1 | 48 |
| 400 | 4 | 180 |

The presulfurization conditions are identical to those of example 1 (TABLE 1)
Total pressure        100 bars
$H_2$ charge ratio    1000 $Nm^3/m^3$

TABLE 4

Characteristics of the charge atmospheric residue from a Venezuelian heavy crude oil) used in the hydrotreatment test of example 7.

| Specific gravity at 20° C. | 1.03 g/$cm^3$ |
|---|---|
| Viscosity at 100° C. | 3400 $mm^{2/s}$ |
| Conradson carbon | 20.3% b.w. |
| Insoluble in n-heptane | 10.9% b.w. |
| Insoluble in n-pentane | 22.0% b.w. |
| Total sulfur | 4.2% b.w. |
| Total nitrogen | 8300 ppm |
| nickel | 160 ppm |
| vanadium | 510 ppm |

EXAMPLE 7

1000 $cm^3$ of catalyst A have been used in fixed bed in the reactor of a hydrotreatment pilot unit, operated in upflow under the conditions stated in example 1; however the total pressure was 150 bars, the hourly volumic space velocity was 0.5 l/l/h and the feed charge was the atmospheric residue of a Venezuelian heavy crude oil whose main properties are mentioned in Table 4. It is known in the art that this charge is more difficult to treat than the deasphalted oil charge used in the test of example 1. More particularly, it has a very high content of condensed polyaromatic molecules of the asphaltene type, which content is determined from the following indicators: the values of the Conradson carbon and of the insolubles in heptane and and pentane.

The test time was about 3000 h and no serious deactivation was observed: the maximum retention capacity of the catalyst had not been attained. The chemical analysis of the catalyst discharged from the reactor indicated 150 g of metals absorbed per 100 g of fresh catalyst. The average performances of the catalyst in the whole test have been substantially the same as those indicated in example 1; the conversion rate of the insolubles in normal heptane, or deasphalting rate, was 50%.

EXAMPLES 8 TO 13

Example 1 was repeated, except that, in the dry impregnation of the alumina balls, ammonium heptamolybdate and nickel nitrate have been replaced respectively with:

(a) 40 g of ammonium heptamolybdate,
(b) 327 g of vanadyl sulfate,
(c) 822.3 g of ferric nitrate nonahydrate,
(d) 348 g of ammonium heptamolybdate and 243.9 g of cobalt nitrate hexahydrate,
(e) 492.5 g of orthotungstic acid monohydrate and 255 g of nickel nitrate hexahydrate.

The respective salts have been each time dissolved in 4200 $cm^3$ of distilled water. After impregnation, all the catalysts have been dried at 110° C. and then calcined for 2 h at 350° C. and then for 2 h at 500° C. as in example 1.

These five catalysts have been used in the hydrotreatment test with accelerated ageing already described in example 6; in each case the performances were substantially the same as for catalyst A, as shown in FIG. 11.

It can thus be concluded that the nature of the metals introduced into the fresh catalyst is not critical as concerns the average activity beyond a certain amount of metals retained; nor is it critical for the ultimate retention capacity of the catalyst.

EXAMPLE 14

The operation was conducted as in example 1 up to the formation of the treated active alumina balls exhibited the sea-urchin structure of the invention and the already described structural characteristics.

1000 $cm^3$ of these balls were used in the reactor of a hydrotreatment pilot unit. After purging of the reactor with nitrogen, a gas mixture of hydrogen/hydrogen sulfide at a 2% by volume concentration was circulated upwardly in the reactor. A feed rate of the gas mixture of 500N liters per hour was selected, the total pressure being 100 bars. The deasphalted oil charge extracted from the Boscan crude oil whose characteristics have been given in Table 2 was introduced into the heat-insulated reactor after preheating to 100° C. This charge was introduced in upflow in sufficient proportion to fill the free space of the reactor and the porosity of the alumina balls, at a feed rate of 0.5 l/h. The temperature of the preheating furnace was increased at a rate of 15° C. per hour to attain 390° C. after about 19 h. The temperature was then maintained at this level and it was ascertained with thermocouples that it was substantially uniform and equal to 390° C. in the whole reactor. These conditions were maintained for 240 h. The pilot unit was then stopped after rinsing of the catalyst with straight-run gas oil. A sample was removed from the reactor and analyzed. The structural characteristics of the so-treated alumina balls were substantially identical to those of catalyst A. When examined with a scanning electronic microscope, it was found that the sea-urchin structure of the invention had been retained, and the chemical analysis showed that the balls had adsorbed about 5 g of metals (nickel+vanadium) per 100 g of initial weight. The experiment was then continued for about 2500 h under conditions identical to those of the test of example 1 and with performances substantially identical in any respect. The 240 h pretreatment of the alumina balls thus conducted to a catalyst similar to catalyst A.

EXAMPLE 15

The test of example 14 was reproduced; however vanadium acetylacetonate was added to the deasphalted oil from the Boscan crude oil, so as to obtain a content of vanadium metal dissolved in the charge of 850 ppm by weight. The pretreatment time was limited to 120 h, then the test was continued under the test conditions of example 1 and the resultant performances were substantially the same, in any respect, as those obtained in the test of example 14. The alumina balls were thus converted to a catalyst by the pretreatment; however the doubling of the metal content solubilized in the charge by adding the vanadium complex resulted in a decrease, in the same proportion, of the pretreatment time for depositing the catalytic metals on the alumina balls.

What is claimed is:

1. In a process for hydrotreating a hydrocarbon, wherein a hydrocarbon charge is contacted with hydrogen in the presence of a supported heterogeneous hydrotreatment catalyst, and wherein said process is subject to catalyst deactivation by pore mouth plugging, the improvement wherein said catalyst comprises a carrier and at least one catalytic metal or compound of a catalytic metal, said metal or at least one of the metals being vanadium, molybdenum, tungsten, nickel, cobalt or iron, wherein said catalyst consists of a plurality of juxtaposed agglomerates each formed of a plurality of acicular platelets, the platelets of each agglomerate being oriented generally radially with respect to one another and with respect to the center of the agglomerate; wherein said catalyst contains a major proportion of wedge-shaped mesopores, and has an improved resistance to pore mouth plugging compared with bimodal or monomodal porous catalysts.

2. A process according to claim 1, wherein in said catalyst, the agglomerates have an average size between about 1 and 20 micrometers, the acicular platelets having an average length between about 0.05 and 5 micrometers, a ratio of their average length to their average width between about 2 and 20 and a ratio of their average length to their average thickness between about 1 and 5000.

3. A process according to claim 1, wherein said catalyst carrier is alumina, whose specific surface is between 50 and 250 m$^2$/g, whose total pore volume is between 0.7 and 2.0 cm$^3$/g and whose pore distribution is:

0–10% of the total pore volume as pores of an average diameter lower than 10 nanometers,
40–90% of the total pore volume as pores of an average diameter between 10 and 100 nanometers,
5–60% of the total pore volume as pores of an average diameter between 100 and 500 nanometers,
5–50% of the total pore volume as pores of an average diameter between 500 and 1000 nanometers
5–20% of the total pore volume as pores of an average diameter greater than 1000 nanometers.

4. A process according to claim 1, wherein said catalyst carrier is alumina comprising 100 to 1000 ppm of silica.

5. A process according to claim 1, wherein said catalyst is manufactured by a process which comprises the steps of:

(a) treating agglomerates of activated alumina in an aqueous medium consisting essentially of a mixture of (i) at least one aqueous acid to dissolve at least a portion of the alumina of the agglomerates to form aluminum ions, and (ii) at least one compound different than said acid and providing anions; said anions being able to combine with the aluminum ions in solution;

(b) simultaneously or subsequently subjecting the acid-treated agglomerates to a heat treatment at a temperature between about 80° C. and 250° C. for a period of from about 5 minutes to about 36 hours the combination of steps (a) and (b) resulting in a modification of the distribution of the pore size of the treated agglomerates in relation to the untreated agglomerates pound.

6. A process according to claim 5, wherein said step (d) is effected by impregnating the agglomerates with an aqueous, organic or aqueous-organic solution of at least one compound of at least one of vanadium, molybdenum, tungsten, nickel, cobalt or iron, then drying the agglomerates and heating them to about 400° to about 800° C.

7. A process according to claim 5, wherein said step (d) is effected by passing a mixture of a hydrocarbon charge with a hydrogenation gas through the agglomerates, said charge comprising, in the dissolved state, at least one compound of at least one of vanadium, molybdenum, tungsten, nickel, cobalt or iron, said compound being in a concentration, x, expressed as weight parts per million with respect to the charge, said hydrogenation gas comprising at least 70% by volume of hydrogen and at least 0.5% by volume of hydrogen sulfide, said passing step being conducted under a total pressure of between 80 and 250 bars at a temperature of between 360° and 420° C., at a space velocity (V.V.N.) of between 0.1 and 2, and at a normalized volume ratio of the gas feed rate to the liquid feed rate of between 500 and 2000, for a time of at least 50,000/x/V.V.H. hours.

8. A process according to claim 1, wherein the hydrocarbon charge comprises at least one vanadium, nickel, iron or titanium compound.

9. A process according to claim 1, wherein the hydrocarbon charge comprises at least one of sulfur, nitrogen and oxygen.

10. A process according to claim 1, wherein in said catalyst, the agglomerates have an average size between 2 and 10 micrometers, the acicular platelets having an average length between 0.1 and 2 micrometers, a ratio of their average length to their average width between 5 and 15, and a ratio of their average length to their average thickness between 10 and 200.

11. A process according to claim 3, wherein in said catalyst, said specific surface is 120–180 m$^2$/g.

12. A process according to claim 3, wherein in said catalyst, said total pore volume is 0.9–1.3 cm$^3$/g.

13. A process according to claim 1, wherein 40–90% of the total pore volume of said catalyst are mesopores of an average diameter between 10 and 100 nanometers, and not more than 10% of the total pore volume are micropores of an average diameter lower than 10 nanometers.

14. A process according to claim 1, wherein in said catalyst, the amount of said catalytic metal or metal compound is 0.5–40% by weight, calculated as the metal oxide.

15. A process according to claim 5, wherein the acid used in said step (a) dissolves at least 0.5% and at most 15% by weight of said alumina.

16. A process according to claim 5, wherein in said step (a), said acid is nitric, hydrochloric, perchloric or sulfuric acid, at a concentration of 1–15% by weight; and wherein said at least one compound providing an anion able to combine with the aluminum ions is a compound able to liberate nitrate, chloride, sulfate, perchlorate, chloroacetate, dichloroacetate, trichloroacetate, bromoacetate, dibromoacetate, formate, acetate, propionate, butyrate or isobutyrate anions in solution, said compound being an acid, anhydride, salt or ester capable of liberating said anion by dissociation or hydrolysis, said salt being a sodium, potassium, magnesium, calcium, ammonium, aluminum or rare earth metal salt.

17. A process according to claim 16, wherein said aqueous medium used in step (a) is a mixture of aqueous nitric and acetic acids, or of aqueous nitric and formic acids.

18. A process according to claim 5, wherein in said step (b), the temperature is 120°-220° C., and the treatment time is from 15 minutes to 18 hours.

19. A process according to claim 5, wherein the treatment in said step (b) is effected under a partial steam pressure of at least 70% of the saturating vapor pressure at the treatment temperature.

20. A process according to claim 1, wherein the hydrotreatment of the hydrocarbon is a hydrodemetallation reaction.

21. A process according to claim 20 wherein said contacting is effected at a temperature of about 370°-470° C., under a hydrogen partial pressure of about 50-300 bars, and a space velocity (VVH) of about 0.3-5, the normalized volume ratio of hydrogen gas to liquid hydrocarbon charge being about 200-5000.

22. A process according to claim 1, wherein said hydrocarbon charge is a crude oil having an API degree lower than 20, an extract from bituminous sands or shales, an atmospheric or vacuum residue, an asphalt, a deasphalted oil, a deasphalted vacuum residue, a deasphalted crude oil, a heavy fuel oil, an atmospheric or vacuum distillate, or a coal liquefaction product.

23. A process according to claim 5, further comprising, in step (c) before subjecting the agglomerates to a thermal activation, drying the agglomerates.

24. A process according to claim 23, wherein said drying is effected at a temperature of about 100°-200° C. for a sufficient amount of time to remove water not chemically bound.

25. A process according to claim 1, wherein the hydrotreatment of the hydrocarbon is a hydrodesulfuration reaction.

26. A process according to claim 1, wherein the hydrotreatment of the hydrocarbon is a hydrodenitrogenation reaction.

27. A process according to claim 25, wherein said contacting is effected at a temperature of about 370°-470° C., under a hydrogen partial pressure of about 50-300 bars, and a space velocity (VVH) of about 0.3-5, the normalized volume ratio of hydrogen gas to liquid hydrocarbon charge being about 200-5000.

28. A process according to claim 21, wherein said contacting is effected at a temperature of about 370°-470° C., under a hydrogen partial pressure of about 50-300 bars, and a space velocity (VVH) of about 0.3-5, the normalized volume ratio of hydrogen gas to liquid hydrocarbon charge being about 200-5000.

29. A process according to claim 1, wherein said contacting is effected at a temperature of about 370° to 470° C. under a hydrogen partial pressure of about 50 to 300 bar, and a space velocity (VVH) of about 0.3 to 5, the normalized volumetric ratio of hydrogen gas to liquid hydrocarbon charge being about 200 to 5000.

* * * * *